United States Patent
Joseph (10) Patent No.: US 8,450,944 B2
(45) Date of Patent: May 28, 2013

(54) INTELLIGENT LIGHT FOR CONTROLLING LIGHTING LEVEL

(75) Inventor: Peter D. Joseph, Twin Lakes, WI (US)

(73) Assignee: J. Baxter Brinkman International Corporation, Dallas, TX (US)

( * ) Notice: Subject to any disclaimer, the term of this patent is extended or adjusted under 35 U.S.C. 154(b) by 842 days.

(21) Appl. No.: 12/334,672

(22) Filed: Dec. 15, 2008

(65) Prior Publication Data
US 2009/0195164 A1 Aug. 6, 2009

Related U.S. Application Data

(60) Provisional application No. 61/026,277, filed on Feb. 5, 2008.

(51) Int. Cl.
*H05B 37/02* (2006.01)

(52) U.S. Cl.
USPC ........................................ 315/307; 315/209 R (58) Field of Classification Search
USPC .............. 315/209 R, 224–226, 291, 307, 362
See application file for complete search history.

(56) References Cited

U.S. PATENT DOCUMENTS

| | | | |
|---|---|---|---|
| 4,540,890 A | 9/1985 | Gangemi et al. | |
| 4,562,382 A | 12/1985 | Elliott | |
| 4,634,936 A * | 1/1987 | Gentry et al. ................. | 315/307 |
| 4,855,891 A | 8/1989 | Paul | |
| 4,871,944 A | 10/1989 | Skwirut et al. | |
| 4,899,062 A | 2/1990 | Konrad | |
| 5,041,952 A | 8/1991 | Janda et al. | |
| 5,086,267 A | 2/1992 | Janda et al. | |
| 5,221,891 A | 6/1993 | Janda et al. | |
| 5,233,270 A | 8/1993 | Nilssen | |
| 5,378,171 A | 1/1995 | Czerlanis | |
| 5,440,204 A | 8/1995 | Shih | |
| 5,686,799 A | 11/1997 | Moisin et al. | |
| 5,811,938 A | 9/1998 | Rodriguez | |
| 5,938,757 A | 8/1999 | Bertsch | |
| 5,982,645 A | 11/1999 | Levran et al. | |
| 6,005,476 A | 12/1999 | Valiulis | |
| 6,229,432 B1 * | 5/2001 | Fridley et al. .............. | 340/12.35 |
| 7,043,611 B2 | 5/2006 | McClannahan | |
| 7,075,414 B2 | 7/2006 | Giannini et al. | |
| 7,155,317 B1 * | 12/2006 | Tran .............................. | 700/259 |
| 7,550,934 B1 * | 6/2009 | Deng et al. ................... | 315/308 |
| 7,632,159 B2 | 12/2009 | Nelson | |
| 2004/0135373 A1 | 7/2004 | Osborne | |
| 2005/0029476 A1 | 2/2005 | Biester et al. | |
| 2005/0082989 A1 * | 4/2005 | Jones et al. ................... | 315/194 |
| 2005/0104543 A1 * | 5/2005 | Kazanov et al. .............. | 315/294 |
| 2005/0195025 A1 | 9/2005 | Leenerts et al. | |
| 2006/0079971 A1 | 4/2006 | Bilo | |

(Continued)

FOREIGN PATENT DOCUMENTS

EP 1108610 5/2004

*Primary Examiner* — Jimmy Vu
(74) *Attorney, Agent, or Firm* — Sheppard, Mullin, Richter & Hampton LLP (57) ABSTRACT

An intelligent light, such as a light for connecting with a low voltage line, is provided. The intelligent light includes a light source for coupling with a low voltage line, and a processor in communication with the light source and the low voltage line. The processor determines a voltage on the low voltage line and operates intermittent switching of the light source as a function of the determined voltage and the intermittent switching used to maintain an output level of the light source.

22 Claims, 7 Drawing Sheets

U.S. PATENT DOCUMENTS

| | | |
|---|---|---|
| 2006/0250095 A1 | 11/2006 | Min et al. |
| 2006/0262542 A1 | 11/2006 | Ibbitson et al. |
| 2007/0222399 A1* | 9/2007 | Bondy et al. ............... 315/291 |
| 2009/0175046 A1 | 7/2009 | Richard |
| 2009/0195063 A1 | 8/2009 | Joseph et al. |
| 2009/0195064 A1 | 8/2009 | Joseph et al. |
| 2009/0195085 A1 | 8/2009 | Joseph |
| 2009/0195179 A1 | 8/2009 | Joseph et al. |
| 2009/0195192 A1 | 8/2009 | Joseph |
| 2009/0195193 A1 | 8/2009 | Joseph |

* cited by examiner

INTELLIGENT LIGHT FOR CONTROLLING LIGHTING LEVEL

RELATED APPLICATION

This application claims priority under 35 U.S.C §119(e) to U.S. Provisional Patent Application No. 61/026,277 filed on Feb. 5, 2008, which is hereby incorporated by reference in its entirety.

BACKGROUND

Low voltage systems are used for powering a variety of devices. For example, low voltage outdoor lights illuminate driveways, pathways, yards, grounds, or other residential or commercial outdoor settings. Some lighting systems include wire from a power supply, and lights are connected along the wire. Intrinsic electrical resistance or other factors of the wire may cause a voltage drop along the wire. Lights closer to the power supply may output light brighter than lights farther away from the power supply because of such voltage drops and/or electrical characteristics. The degradation of voltage along the wire may also produce a shift in the color spectrum. For example, lights closer to the power supply may shine bright with a white color while lights farther away from the power supply may shine less bright with a yellow or reddish color. Such effects may be aesthetically and functionally undesirable.

Heavy gage wire in combination with individual wires connecting between a wiring hub and the lights may used to reduce voltage drops. However, such configurations may require relatively complex installation including balancing line voltage using voltmeters as well as increased costs. A higher voltage power supply may be used to attempt to maintain similar voltages at the individual lights for preferable brightness. Yet, higher voltages may impose on regulations.

BRIEF SUMMARY

In one aspect, an intelligent light is provided. The intelligent light includes a light source that couples with a low voltage line. A processor is in communication with the light source and the low voltage line. The processor determines a voltage on the low voltage line and operates intermittent switching of the light source as a function of the determined voltage. The intermittent switching is used to maintain an output level of the light source.

Other systems, methods, features and advantages of the design will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the design. Moreover, in the figures, like referenced numerals designate corresponding parts throughout the different views.

DETAILED DESCRIPTION

Figure 1:
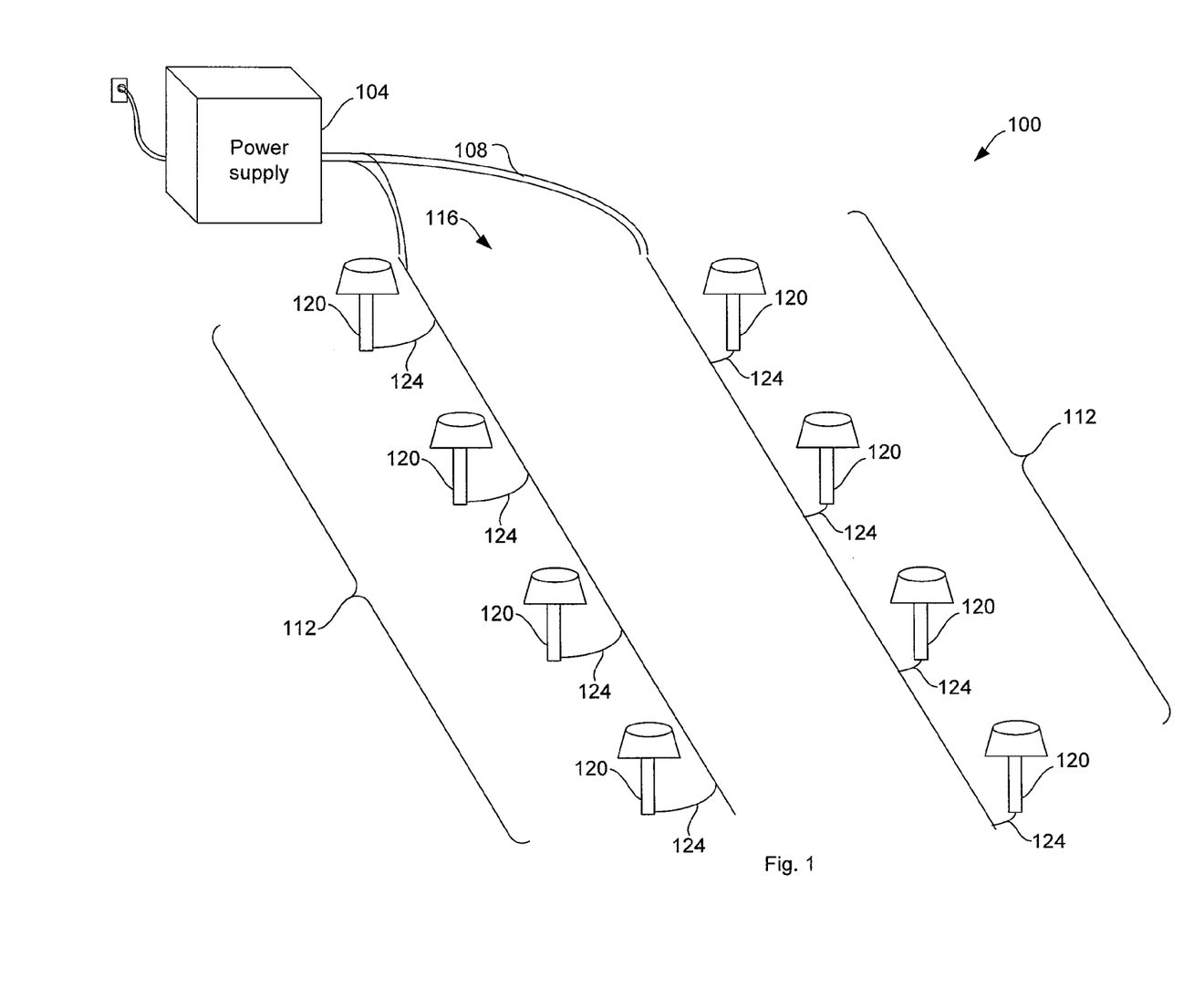
FIG. 1 is a perspective view of a lighting system.

FIG. 1 is a perspective view of a light system 100. The system 100 is an outdoor light system, indoor light system, or other system that produces or emits light. For example, the system 100 is an outdoor lighting system. The system 100 includes, but is not limited to, a power supply 104, a power supply line 108, a plurality of lights 112, and a surrounding 116. Fewer, more, or different components, devices, or features may be provided.

The power supply 104 is used to supply power to the lights 112 via the power supply line 108. For example, the power supply 104 is a low voltage power supply that electrically connects with a standard wall outlet or other high voltage outlet that provides at least 90 alternating current volts ("VAC") RMS or 110 VAC RMS. The power supply 104 converts the at least 90 VAC RMS or 110 VAC RMS to at most 15 VAC RMS, such as 12 VAC, to power the lights 112. The power supply 104 may include timers, photo sensors, and/or a switch to turn the power supply on or off. Also, the power supply 104 may generate an encoded signal to power and communicate with the lights 112 and/or other remote devices connected with the power supply line 108, such as described in U.S. provisional application No. 61/026,282, filed on Feb. 5, 2008, and also U.S. patent application Ser. No. 12/334,656 filed on even date herewith, both of which are entitled "POWER LINE COMMUNICATION," and are both hereby incorporated by reference.

The power supply line 108 may be arranged in a number of configurations to supply power to the lights 112. For example, the power supply line 108 may be arranged in a U-shape or a semi-circular shape, the power supply line 108 may be split into a Y or V-shape, and/or the power supply line 108 may be routed under, over, or through various structures to supply power to the lights 112, which may be arranged about or near the surrounding 116. Alternatively, additional power supply lines and/or additional power supplies may be used.

The surrounding 116 is a pathway, sidewalk, driveway, and/or other outdoor setting. Alternatively, the surrounding 116 may be indoors. For example, the surrounding 116 may be a stair case, hallway, or other indoor setting. The surrounding 116 may be an area in which people or animals may walk upon or may be an area not to be treaded upon.

The plurality of lights 112 are adjacent or near the surrounding 116. For example, the plurality of lights 112 illuminate the surrounding 116 or areas close to the surrounding 116. The plurality of lights 112 may be arranged in a variety patterns, such as in a row or column sequence, relative to the surrounding 116. Alternatively, the plurality of lights 112 may be placed away from the surrounding 116 or at other outdoor or indoor settings.

Each light 112 includes, but is not limited to, a light fixture 120 and a connection 124. Fewer, more, or different components may be provided. For example, all or some part of the connections 124 may be separate from the lights 112, part of the power supply line 108, and/or separate from the power supply line 108.

The light fixture 120 includes a housing to support or enclose a light source, such as a light bulb or one or more light emitting diodes ("LEDs"). The housing is made of conductive and/or non-conductive material. For example, the housing has a metal or plastic frame that surrounds the light source. Glass or plastic acting as a window or pass way to direct or emit light may be supported by the frame. Alternatively, the window or pass way may be one or more opening or holes in the housing. The housing has a substantially cone, rectangular, or other geometrical shape.

The light fixture 120 may also include a support, such as a stand and/or base. The support may be an integral part of the housing or may be a separate part that is attachable to the housing. The support rests on a surface or may be placed under a surface, such as under the ground of an outdoor environment. The light fixture 120 is moveable or transferable and may be placed in various desired locations.

Each of the lights 112 connect with the power supply line 108 via the connection 124. The connection 124 is a wire or cable that includes a connector. The connector has two pins that penetrate a cover of the power supply line 108 and electrically connect with internal conductors. Alternatively, other connectors may be used. The connection 124 supplies a low voltage, such as the 12 VAC, to the light 112.

Because of internal resistances, inductances, and/or other electrical, electromagnetic, and/or mechanical factors, voltage drops may occur along the power supply line 108. A 3 volt drop may occur over the span of the power supply line 108. For example, a voltage on the power supply line 108 may be around 12 VAC near or at a location of a light 112 close to the power supply 104, and a light 112 farther away from the power supply 104, such as at the end of the power supply line 108, may experience or receive about 9 VAC.

Figure 2:
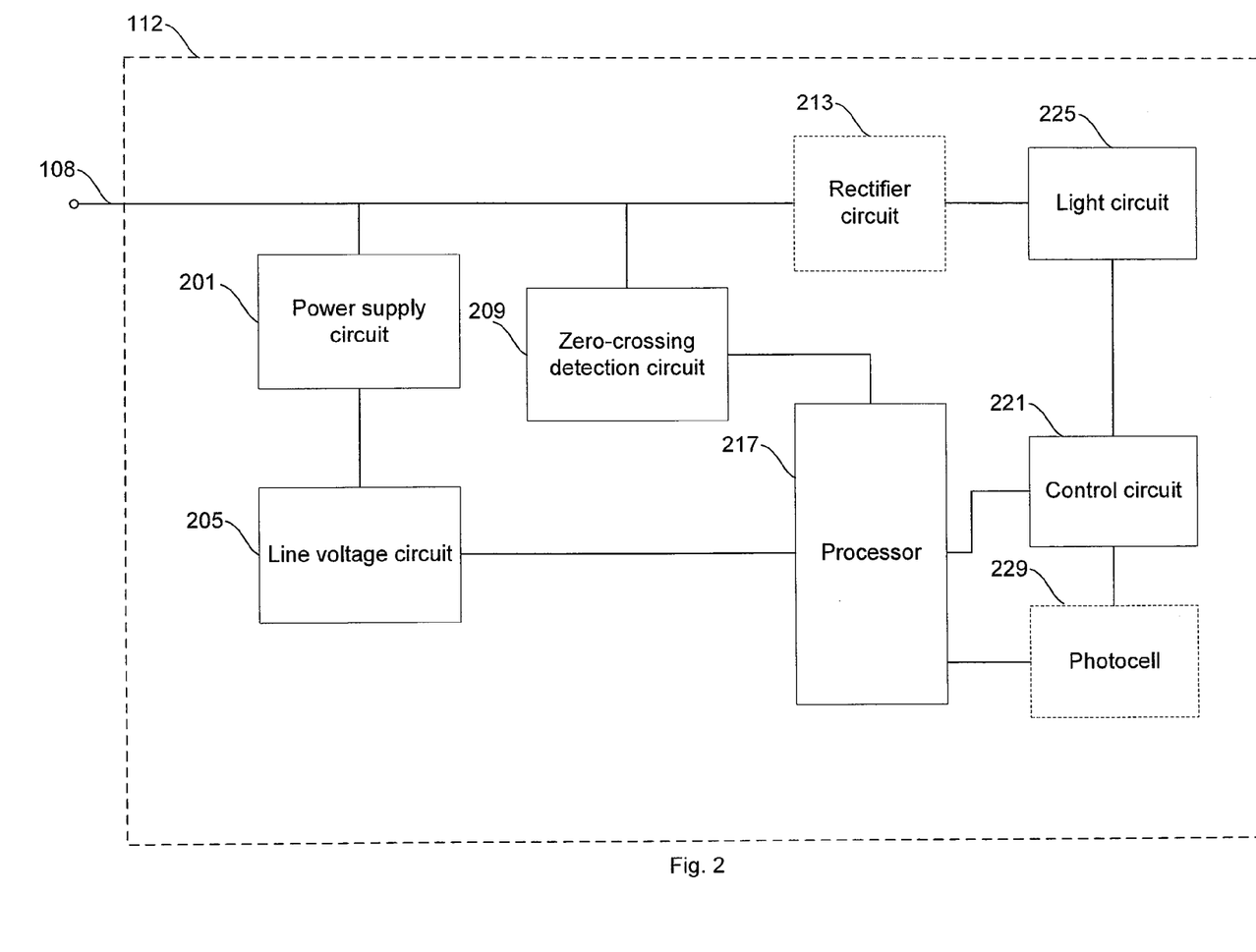
FIG. 2 is a block diagram illustrating components of a light of the lighting system of FIG. 1.

FIG. 2 is a block diagram illustrating components of one or more of the lights 112. For example, the light 112 includes a power supply circuit 201, a line voltage circuit 205, a zero-crossing detection circuit 209, a processor 217, a control circuit 221, and a light source 225. Fewer, more, or different components may be provided. For example, a rectifier circuit 221 and/or a photocell 229 may be provided.

The power supply circuit 201 includes a linear regulator or other device that converts or down-converts a higher voltage to a lower voltage. The power supply circuit 201 provides a lower direct current voltage ("VDC") to power other components. For example, the power supply circuit 201 converts the 12 volts on the power supply line 108 to substantially a 3.3 VDC. Alternatively, the voltage on the power supply line 108 may be rectified into a DC voltage, such as by the rectifier circuit 213, and the power supply circuit 201 may convert the higher DC voltage from the rectifier circuit 213 to a lower DC voltage, such as a 3.3 VDC.

The rectifier circuit 213 may include diodes that rectify an alternating current voltage. Alternatively, other components such as transistors or a switching power supply may be used to rectify the alternating current voltage on the power supply line 108. The rectifier circuit 213 may also include a capacitor or other component or device to smoothen or filter a rectified voltage or signal into a substantially DC voltage.

The line voltage circuit 205 provides a voltage or current to the processor 217 in which the voltage or current corresponds to a line voltage of the power supply line 108 where the light 112 is located at. The line voltage circuit 205 includes passive components, such as resistors, inductors, and/or capacitors. The line voltage circuit 205 may also include active components used to convert a voltage on the power supply line 108 to a suitable voltage or current for the processor 217. Alternatively, the line voltage circuit 205 may connect with the power supply circuit 201.

The zero-crossing detection circuit 209 is in communication with the power supply line 108. The zero-crossing detection circuit 217 includes diodes, one or more transistors, such as a photo-transistor, resistors, and/or a capacitor. The zero-crossing detection circuit 209 detects or senses when the 12 VAC on the power supply line 108 crosses a substantially zero or mean voltage. The zero-crossing detection circuit 209 provides a signal or lack of a signal to the processor 217 for all or some of the crossings. The detection of the zero or mean crossings may be used to reduce noise and/or errors in determining voltage on the power supply line 108 by the processor 217. For example, the processor 217 may synchronize sample measurements of the voltage on the power supply line 108 where the light 112 is located with the zero or mean crossings. Additionally, a filter, such as a software filter implemented in the processor 217 or other components, may be used to minimize or reduce errors in determining voltage on the power supply line 108 due to line noise.

The processor 217 controls the operation of the light source 225 by a control circuit 221. The processor 217 is a general processor, application-specific integrated circuit ("ASIC"), digital signal processor, field programmable gate array ("FPGA"), digital circuit, analog circuit, or combinations thereof. The processor 217 is one or more processors operable to control and/or communicate with the various electronics and logic of the light 112. The processor 217 may control the operation of the light source 225 as a function of data, bits, or commands that may be encoded in a power signal, such as a square wave or pulse signal, on the power supply line 108. Different bits may correspond to different pulse widths, and the processor 217 may determine a command by reading bit sequences via the zero-crossing detection circuit 209.

The processor 217 outputs one or more signals to the control circuit 221 to control the operation of the light source 225. For example, the control circuit 221 includes a switch that turns on and off in response to the signal or lack of the signal from the processor 217. The switch may be one or more TRIACs, transistors, or other electrical devices that can operate as a switch. The switching of the control circuit 221 electrically disconnects and connects the light source 225 from the power supply line 108. Alternatively, the switch can connect or disconnect the light source 225 between ground. For example, the light source 225 is turned constantly on or constantly off.

Alternatively, the brightness level of the light source 225 can be dimmed or increased. For example, the processor 217 outputs a pulse width modulated signal or a phase control signal to intermittently switch the light source 225 on and off via the control circuit 221. Increasing a duty cycle or frequency, with fixed on time, of the signal outputted from the processor 217 increases a brightness level of the light source. Decreasing a duty cycle or frequency, with fixed on time, of the signal outputted from the processor 217 decreases a brightness level of the light source. Because the power supply line 108 provides an alternating signal to power the light source 225, switching operation of the control circuit 221 is synchronized with the rise and fall of the alternating signal to appropriately switch the light source 225 on and off. Alternatively, the rectifier circuit 213 provides a substantially DC power supply voltage to the light source 225. This may reduce the number of components in the control circuit 221 because both negative and positive power signals may not need to be taken in consideration for switching operations.

The line voltage circuit 205 may be used to set a desired duty cycle or frequency of the signal outputted by the processor 217. For example, the processor 217 includes a look-up-table or other correlation information that correlates a voltage received by the line voltage circuit 205 with an estimated or measured voltage on the power supply line 108 where the light 112 is connected at. If the processor 217 determines that the line voltage is low, the processor 217 may increase the duty cycle or frequency, with fixed on time, of the output signal to increase a brightness level of the light source 225. Also, the processor 217 may initially turn of the light source 225 using a soft start. For example, the duty cycle is gradually increased from zero to the desired duty cycle for a few seconds when the light 112 is initially powered on. The soft start may preserve or extend the life span of the light source 225 and/or act as an attractive or aesthetic feature.

Lights 112 that are closer to the power supply 104 and have a higher line voltage may operate at a lower duty cycle or frequency, with fixed on time, and lights farther away from the power supply line having a lower line voltage may operate at a higher duty cycle or frequency. This way the all the lights along the power supply line 108 may achieve a constant or uniform brightness and/or color irrespective of the voltage on the power supply line. Alternatively, various lighting patterns may be achieved. For example, the processor 217 may operate the respective light sources to illuminate the lights 112 from a low or dim brightness to a higher brightness as the lights 112 become farther away from the power supply 104, or vice versa. Additionally, light sources, such as an incandescent bulb, that are closer to the power supply 104 may have an extended life due to the ability to lower voltages present.

If the power signal, such as a square wave signal or a pulse signal, on the power supply line 108 includes varying pulse widths, a flickering phenomenon may occur when dimming the light source using pulse width modulated or phase control signal. To compensate for the varying pulse widths, the processor 217 may generate pulses of the pulse width modulated or phase control signal that are synchronized with the different widths of the power signal. By adjusting the pulse width modulated or phase control signal, the synchronized timing of intermittingly turning the light source on and off substantially reduces flickering.

The light source 225 is one or more light emitting diodes ("LEDs"), incandescent lights, or other device that emits light. For example, the light source 225 includes two LEDs or one incandescent light bulb rated at 20 watts. The light source 225 may be a conventional or a custom light bulb or LED. To help maintain a constant brightness along the lights 112, higher rated incandescent light bulbs may be used. For example, if the lights 112 are rated at 11 watts, 20 watt bulbs may be used.

The light source 225 emits light through a plastic, glass, air, or other medium to illuminate surroundings. Different colors may be illuminated by using a different colored mediums or housings. Alternatively, the light source 225 may emit different desired colors as a function of different applied currents, voltages, and/or signals.

Alternatively, the photocell 229 is in communication with the processor 217 and/or the control circuit 221. For example, the photocell 229 is a photovoltaic cell, solar cell, photodiode, and/or other device that converts sunlight, solar energy, and/or ultraviolet light into an electrical charge, potential, voltage, and/or current. The photocell 229 may include one or more photocells. The photocell 229 may be included in one or more of the lights 112. For example, the photocell 229 is on a top or side surface of the housing. Alternatively, the photocell 229 may be on a base or support of the light fixture 120.

The photocell 229 is used as a sensor or trigger to switch the light source on or off. For example, when the photocell 229 receives light energy, it outputs a certain voltage and/or current level. The voltage and/or current level is monitored, sensed, and/or determined by the processor 217. When the processor 217 determines that the voltage and/or current level is at or below a predetermined threshold, the processor 217 may command the control circuit 221 to switch on the light source 225. When the processor 217 determines that the voltage and/or current level is at or above the same or different predetermined threshold, the processor 217 may command the control circuit 221 to switch off the light source 225. The low and/or high thresholds may correspond to a time of the day, such as dusk or dawn. Alternatively, the photocell 229 may connect with the control circuit 221 to switch the light source 225 on or off without the use of the processor 217. For example, the control circuit 221 may include circuitry to determine to switch on or off based on an output of the photocell 229.

Figure 3:
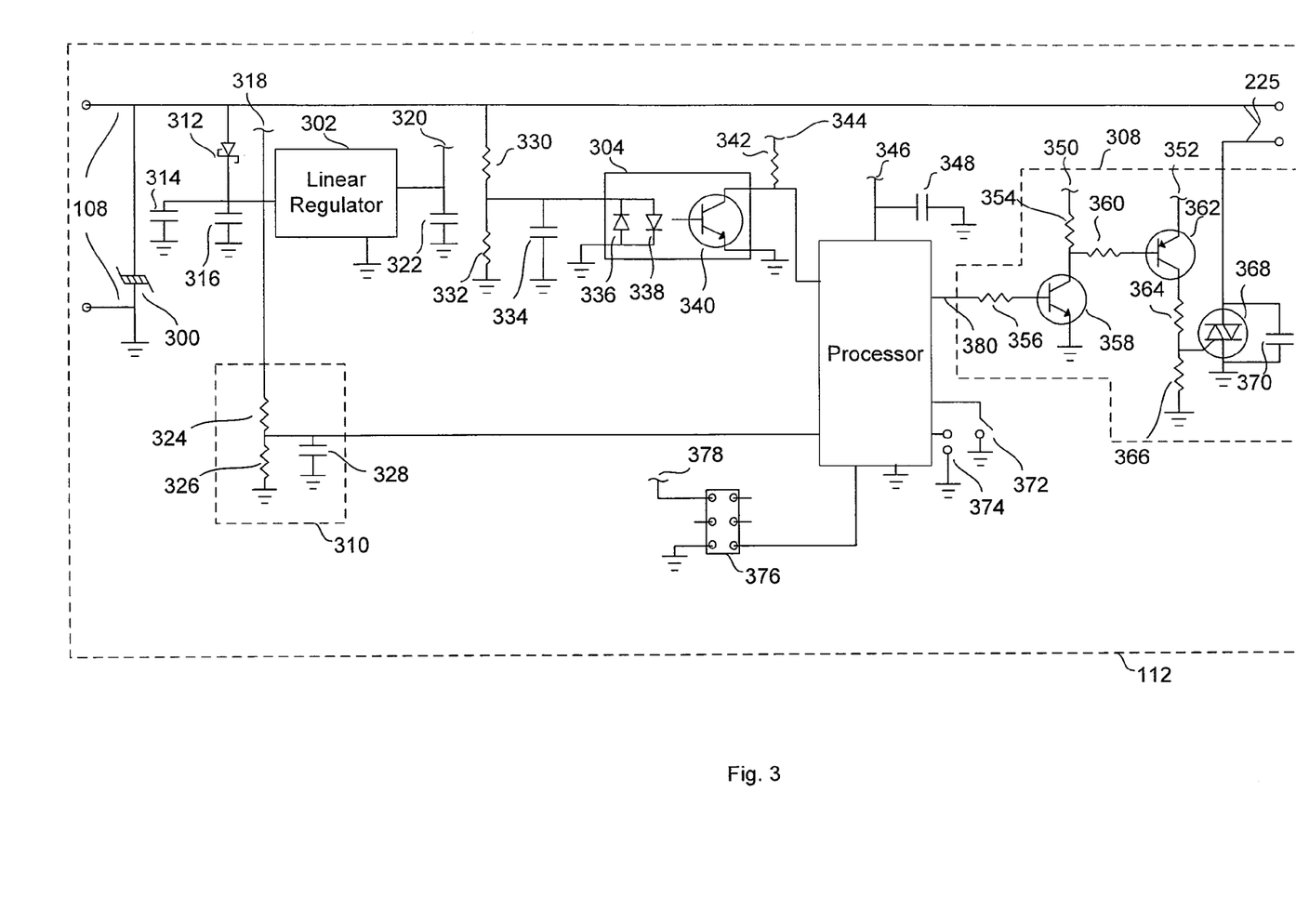
FIG. 3 is a circuit schematic of the light of FIG. 2.

FIG. 3 is a circuit schematic of one of the lights 112. Fewer, more, or different components may be provided. A MOV 300 is connected across the power supply line 108. The MOV 300 is used to protect from or suppress overvoltages that may develop or occur on the power supply line 108. Alternatively, other overvoltage suppression devices, such as a thyristor or zener diode, may be used.

A diode 312 and capacitors 314 and 316 are used to rectify and provide a DC voltage 318. The voltage 318 is about 12 or 15 VDC. The diode 312 may be a Schottky diode or other diode. Some or all diodes described herein may be Schottky diodes or other type of diodes. The capacitors 314 and 316 have a capacitance of about 47 μF. Alternatively, other capacitance values may be used. A linear regulator 302 converts the voltage 318 into a lower DC voltage 320. For example, the voltage 320 is about 3.3 VDC. The linear regulator 302 is biased by capacitor 322. The capacitor 322 has a capacitance of about 47 μF. Alternatively, other capacitance values may be used. The voltages 318 and/or 320 may be used to provide voltage to other components of the light 112.

The voltage 318 is provided to a line voltage circuit 310, such as the line voltage circuit 205. The line voltage circuit 310 includes a resistor 324, a resistor 326, and a capacitor 328. The line voltage circuit 310 acts as a voltage divider to provide a voltage to the processor 306 that corresponds to a voltage on the power supply line 108 where the light 112 is connected. The resistors 324 and 326 have resistances of about 5.1K Ohms and 1K Ohms, respectively, and the capacitor 328 has a capacitance of about 0.1 μF. Alternatively, other values may be used.

A zero-crossing detection circuit 304 is coupled with the power supply line 108 via a capacitor 334 and a voltage divider including a resistor 330 and a resistor 332. The resistors 330 and 332 have a resistance of about 3.3K Ohms and 1K Ohms, respectively, and the capacitor 334 has a capacitance of about 0.1 μF. Alternatively, other values may be used. The voltage divider and capacitor 334 provide a voltage to diodes 336 and 338 that switch a transistor 340 on or off based on a zero or mean crossing of the power signal on the power supply line 108. The transistor 340 is a photo-transistor, MOSFET, JFET, PNP, NPN, or other transistor.

For example, the diodes 336 and 338 are LEDs that emit light when a voltage is present or a non-zero or mean crossing occurs, and the transistor 340 is a photo-transistor that takes a supply voltage 344 to ground when there is a non-zero or mean crossing based on the emission of the diodes 336 and 338. Therefore, the processor 306 recognizes a zero or mean crossing when the supply voltage 344 is asserted from an input to the processor 306. The voltage 344 is connected with the zero-crossing circuit 304 and the processor 306 via a pull-up resistor 342. The voltage 344 is the same as the voltage 318 or the voltage 320. The resistor 342 has a resistance value of about 1K Ohms. Alternatively, other resistance values may be used.

The processor 306 is similar to the processor 217. The processor 306 is powered by the voltage 346 and a supply capacitor 348. The voltage 346 is the same as the voltage 318 or 320. The capacitor 348 has a capacitance of about 0.1 µF. Alternatively, other capacitance values may be used. The processor 306 is operable to connect with a connector 376. The connector 376 is used to debug or program the processor 306. For example, the connector 376 is powered by a voltage 378, which is the same as or different than the voltage 320, and includes six pins. Fewer or more pins may be provided.

A switch 372 and a connector 374 may also couple with the processor 306. The switch 372 is used to manually turn on or off or control the light 112. For example, the switch 372 is a single or multi-pole switch or other switch supported by a housing of the light 112. A switch position of the switch 372 may command the processor 306 to operate the components of the light 112, such as the control circuit 308 or the light source 225 in a predetermined manner. For example, the switch 372 may be used to manually dim one of the lights 112. The connector 374 may be used to further send signals to the processor 306 for a desired action. For example, the connector 374 is a jumper or other connection to change a mode or other feature of the processor 306.

The processor 306 is operable to send one or more control signals to the control circuit 308 via a pin or port 380. Other pins or ports may be used to communicate with the control circuit 308. The control circuit 308 is similar to the control circuit 221. The switching operation of the control circuit 308 is able to turn the light source 225 on or off or change a brightness level of the light source 225, as previously mentioned.

The control circuit 308 includes a transistor 358 and a transistor 362, which are connected with voltages 350 and 352, respectively. The voltages 350 and 352 are at a same voltage as the voltage 318. The transistors 358 and 362 act a voltage and/or current amplifier to provide current or voltage to a TRIAC 368. The transistors 358 and 362 are MOSFET, JFET, PNP, NPN, or other transistors. The transistors 358 and 362 are biased by resistors 356, 354, and 360. An output of the transistor 362 is connected with the TRIAC via a voltage divider including resistors 364 and 366. The signal from pin 380, which may be a pulse modulated signal or phase or frequency control signal, is amplified by the transistors 358 and 362 and switches the TRIAC on and off to effectively set or adjust an output or brightness level of the light source 225. The TRIAC 368 is biased by a capacitor 370. The resistors 356, 354, 360, and 366 have a resistance value of 10K Ohms each, the resistor 364 has a resistance value of 330 Ohms, and the capacitor 370 has a capacitance of 0.1 µF. Alternatively, other values may be used.

Also, a heat sink 380 or other device or structure configured to dissipate or direct heat away from circuitry may be provided in the light 112.

Figure 4:
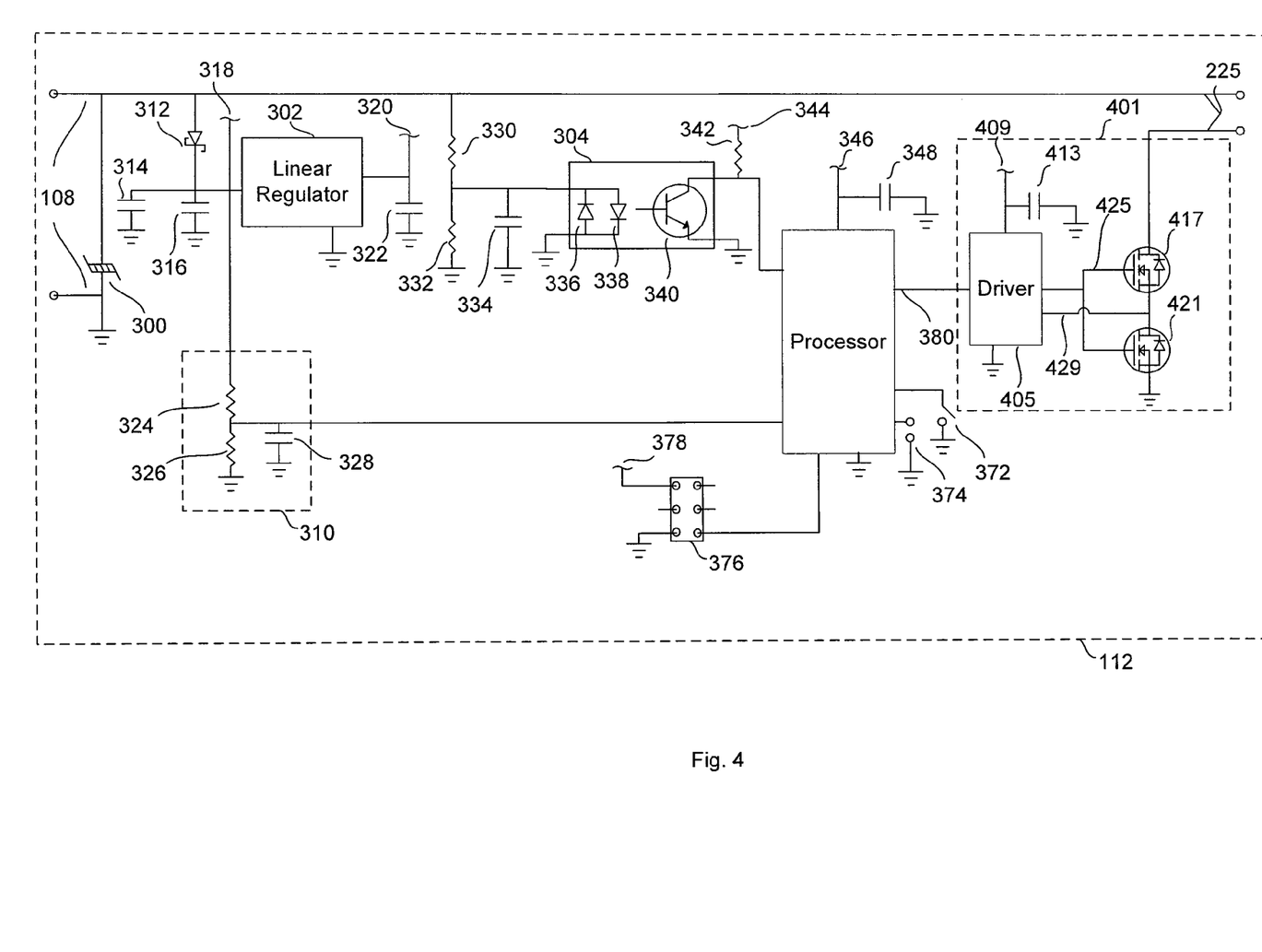
FIG. 4 is an alternate circuit schematic of the light of FIG. 2.

FIG. 4 is an alternate circuit schematic of one of the lights 112. Fewer, more, or different components may be provided. For example, the components of the circuit of FIG. 4 are similar to the components of FIG. 3 except for a control circuit 401.

The control circuit 401 may be similar to the control circuit 221. The control circuit 401 includes a driver 405, a transistor 417, and a transistor 421. Fewer, more, or different components may be provided. The driver 405 is a FET driver that controls a switching operation of the transistors 417 and 421. For example, in response to a pulse width modulated signal or a phase or frequency control signal from the processor 306, the driver outputs a positive or negative signal from output 425 based on a reference voltage 429 to switch one of the transistors 417 and 421 on or off. Because the power signal on the power supply line is an alternating signal, the polarity across the transistors is determined via the reference voltage 429 to appropriately switch the light source 225 on and off to set an output or brightness level.

The driver 405 is powered by a voltage 409 and a capacitor 413. The voltage 409 is similar to the voltage 320. The capacitor 413 has a capacitance value of about 0.1 µF. Alternatively, other capacitance values may be used. The transistors 417 and 421 are MOSFET, JFET, PNP, NPN, or other transistors. For example, the transistors 417 and 421 are MOSFETs that are connected in opposite configurations to accommodate for both positive and negative signals.

Figure 5:
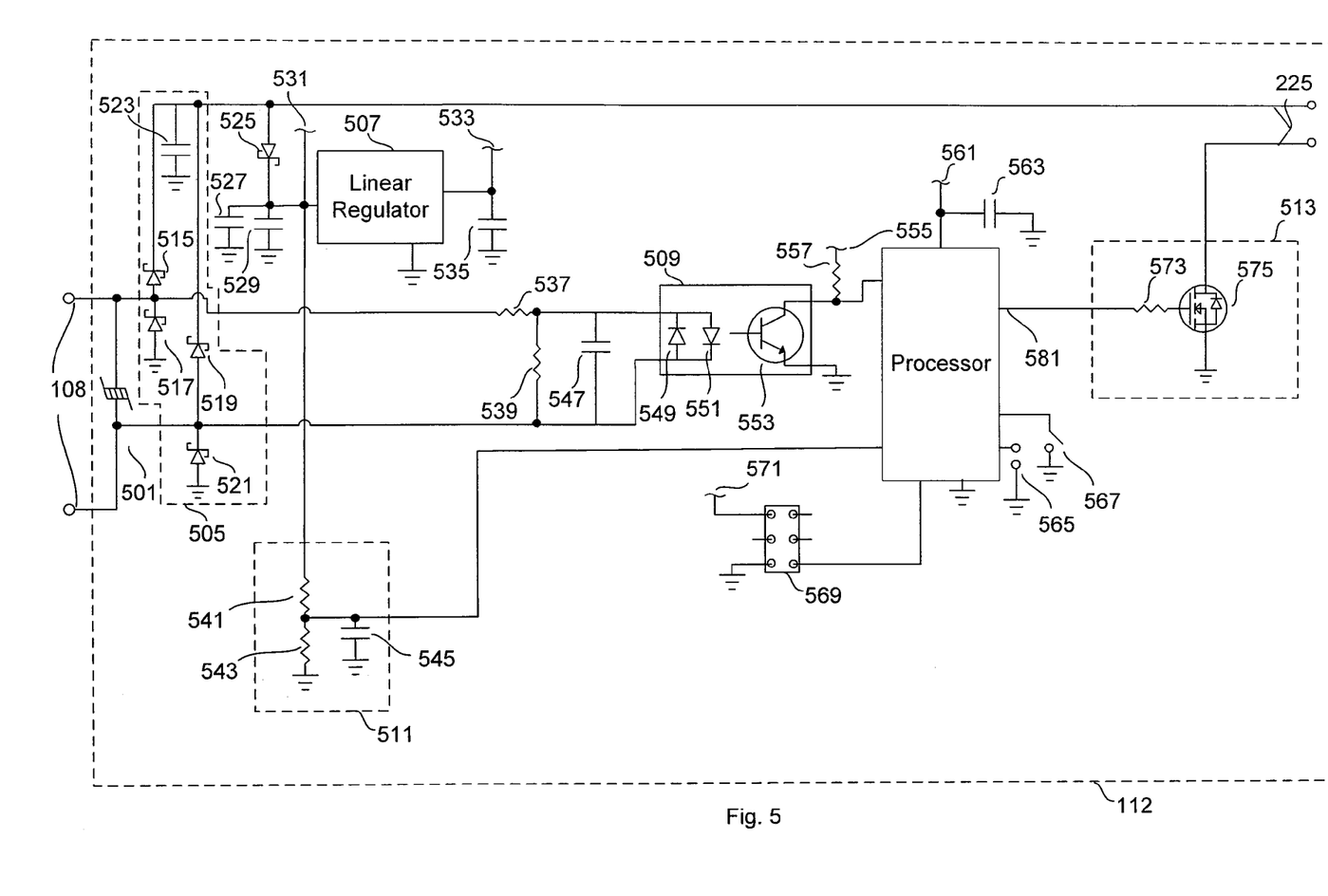
FIG. 5 is another alternate circuit schematic of the light of FIG. 2.

FIG. 5 is an alternate circuit schematic of one of the lights 112. Fewer, more, or different components may be provided. A MOV 501 is connected across the power supply line 108. The MOV 300 is similar to the MOV 300. A rectifier circuit 505 is connected with the output of the MOV 501. The rectifier circuit 505 may be similar to the rectifier circuit 213. The rectifier circuit 505 includes diodes 515, 517, 519, 521, and a capacitor 523. The diodes 515, 517, 519, and 521 are arranged to rectify negative signals of the power signal on the power supply line 108 to positive signals. The capacitor 523 is used to smoothen the rectified signal to a substantially DC voltage, such as a 12 VDC. The diodes 515, 517, 519, and 521 are Schottky diodes or other diodes. The capacitor 523 has a value of about 4700 µF. Alternatively, other capacitance values may be used.

A diode 525 and capacitors 527 and 529 are used to provide a DC voltage 531 from the rectifier circuit 505 to a linear regulator 507. The voltage 531 is about 12 VDC. The capacitors 527 and 529 are similar to the capacitors 314 and 316, respectively. The linear regulator 507 is similar to the linear regulator 302. For example, the voltage 533 is about 3.3 VDC. The linear regulator 507 is biased by capacitor 535, which is similar to the capacitor 322.

The voltage 531 is provided to a line voltage circuit 511, such as the line voltage circuit 310. The line voltage circuit 511 includes a resistor 541, a resistor 543, and a capacitor 545, similar to the resistor 324, the resistor 326, and the capacitor 328, respectively. A zero-crossing detection circuit 509, similar to the zero-crossing detection circuit 304, is coupled with the power supply line 108 via a capacitor 547 and a voltage divider including a resistor 537 and a resistor 539, similar to the capacitor 334 and the voltage divider including the resistor 330 and the resistor 332, respectively. The voltage divider and capacitor 547 provide a voltage to diodes 549 and 551 that switch a transistor 553 on or off, similar to the diodes 336 and 338 that switch the transistor 340 on or off.

For example, a voltage 555 is connected with the zero-crossing detection circuit 509 and a processor 509 via a resistor 557. The voltage 555 and resistor 557 are similar to the voltage 344 and resistor 342, respectively. The processor 509 is similar to the processor 217 and/or 306. The processor 509 is powered by a voltage 561 and a supply capacitor 563, similar to the voltage 346 and the supply capacitor 348, respectively. The processor 509 is operable to connect with a connector 569, similar to the connector 376, that is powered by a voltage 571, similar to the voltage 378.

A switch 567 and a connector 565 may also couple with the processor 509, such as the switch 372 and the connector 374. The processor 509 sends one or more signals, such as a pulse width modulated signal or phase or frequency control signal to a control circuit 513 via a pin, output, or port 581, such as the pin 380. The control circuit 513 includes a transistor 575 and a resistor 573. The signal from pin 581 intermittently switches the transistor 575 on and off to set an output or brightness level of the light source 225 or to constantly turn the light source 225 on or off. Because a DC signal is used to power the light source 225, at most one transistor may be used to control the switching operation of the light source 225. Fewer or more transistors may be used. The transistor 575 is a MOSFET, JFET, PNP, NPN, or other transistor. The resistor 573 has a resistance value of about 100 Ohms. Alternatively, other resistance values may be used.

Also, a heat sink 577, similar to the heat sink 380, or other device or structure configured to dissipate or direct heat away from circuitry may be provided in the light 112.

Figure 6:
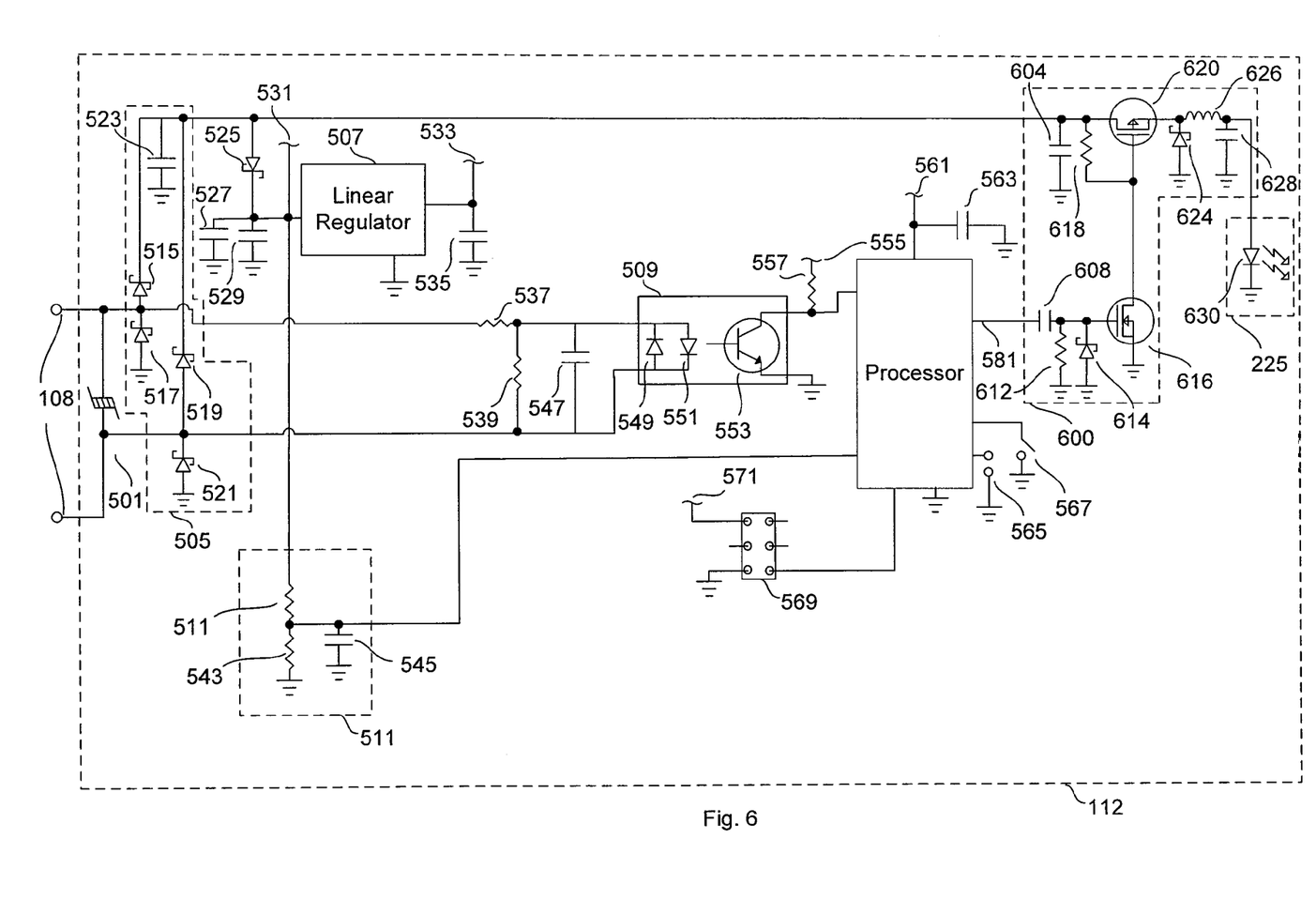
FIG. 6 is another alternate circuit schematic of the light of FIG. 2.

FIG. 6 is another alternate circuit schematic of one of the lights 112. Fewer, more, or different components may be provided. For example, the components of the circuit of FIG. 6 are similar to the components of FIG. 5 except for a control circuit 600.

The control circuit 600 may be similar to the control circuit 221. The control circuit 600 includes a transistor 616 that is biased by a capacitor 608, a resistor 612, a diode 614. The control circuit 600 also includes a transistor 620 that is biased by a capacitor 604, a resistor 618, a diode 624, an inductor 626, and a capacitor 628. Fewer, more, or different components may be provided. The output signal from the processor 509 intermittently switches the transistors 616 and 620 on and off, which effectively disconnects and connects the power to inductor 626. This varying current is then coupled to light source 225 to control an output or brightness level of the light source 225. Also, the transistors 616 and 620 as well as the biasing components step up or increase a voltage or current to the light source 225. Switching the power on and off to inductor 626 and hence the light source 336 may be more efficient than disconnecting and connecting the light source 225 from a constant power source because of power supply response issues.

The capacitor 604 has a capacitance of about 330 µF, the capacitor 608 has a capacitance of about 0.1 µF, the capacitor 628 has a capacitance of about 100 µF, and the inductor 626 has an inductance of about 100 µH. The resistor 612 has a resistance of about 100K Ohms, and the resistor 618 has a resistance of about 10K Ohms. The diodes 614 and 624 may be used as pass and protection devices. The transistors 616 and 620 are MOSFET, JFET, PNP, NPN, or other transistors.

The light source 225 includes one LED 630. Alternatively, the light source 225 may include two or more LEDs and/or may include a different device that emits light. The LED 630 may produce one or more output light colors.

The electrical circuits described above may include parts or components manufactured by Freescale Semiconductor, Inc., Motorola, Inc., National Semiconductor Corp., Infineon Tech., and/or other manufactures. For example, the processors described above may include a MC9S08 series microprocessor from Freescale Semiconductor, Inc.

Figure 7:
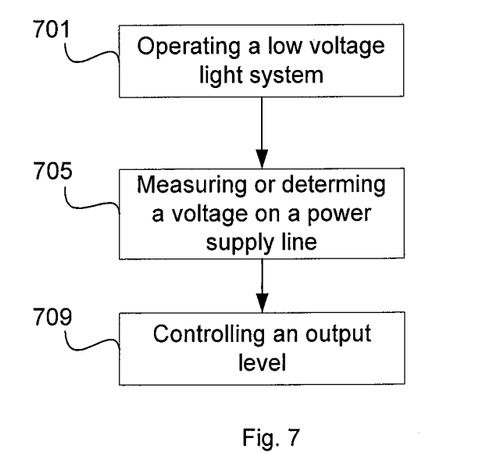
FIG. 7 is a flowchart illustrating a method for controlling a lighting level.

FIG. 7 is a flowchart illustrating a method for controlling a lighting level. Fewer, more, or different blocks or acts may be provided. A low voltage light system, such as the system 100 is operated, as in block 701. A user arranges one or more lights, such as the lights 112, in an indoor or outdoor environment. For example, the user arranges lights connected to a power supply, such as the power supply 104, via a power supply line, such as the power supply line 108, along a pathway or other setting. The user turns on the power supply to operate the lights, or the power supply turns on by a timer or other circuit.

In block 705, a voltage on the power supply line is measured or determined by each light. For example, each light determines the voltage on the power supply line at the location where the light is coupled with the power supply line. Voltage may drop along the power supply line due to internal resistance as well as other electrical and/or mechanical factors.

An output or brightness level of each light is controlled, as in block 709. Each light controls an output level based on the respective measured or determined voltage on the power supply line. For example, each light pulse width modulates or uses a phase or frequency signal to intermittently switch a light source, such as the light source 225, on and off to achieve a desired output or brightness level. The lights may include a processor, such as the processor 217, 306, and/or 509, that correlates an output level with a duty or frequency cycle to switch the light source on and off.

Therefore, all the lights along the power supply line may be programmed to output a constant brightness level along the power supply line irrespective of the voltage at each light. For example, lights closer to the power supply having a higher voltage may use a lower duty cycle compared to lights farther away from the power supply that have a lower voltage. Other brightness patterns may be programmed. Also, a user may dim or brighten certain lights via a switch, such as the switch 374 or 565. Additionally, when the lights are initially turned on a soft start feature may be utilized. For example, a duty cycle of zero is gradually increased, such as over a few seconds, to a desired duty cycle. This may extend a life of the light source.

Figure 8:
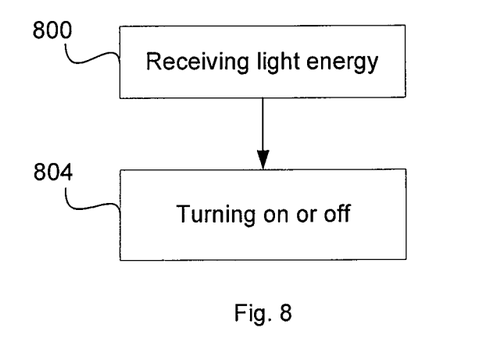
FIG. 8 is a flowchart illustrating a method for operating a light.

FIG. 8 is a flowchart illustrating a method for operating a light. One or more lights receive light energy, as in block 800. For example, a wired low voltage light, such as one or more of the lights 112 or another light that does not include all of the features of the lights 112, may receive and/or store light energy via a photocell, such as the photocell 229. The light converts the received light energy into electrical energy, such as through the photocell.

In block 804, the light determines to turn on or off as a function of received light energy or the corresponding electrical energy level. For example, a light determines a time or a darkness level based on the amount of electrical energy generated, such as via a processor. The light may turn on or off based on the determination of time or darkness level. Alternatively, the light senses the voltage and/or current level outputted from the photocell, such as via a processor, switch circuitry, or other circuitry, and turns on or off when the voltage and/or current level is above or below one or more predetermined thresholds.

Other features described above may be used for additional or other methods of use. Also, the features, components, and/or structures described above may be organized or identified in one or more methods of manufacture.

The logic, software or instructions for implementing the processes, methods and/or techniques discussed above may be provided on computer-readable a non-volatile memory, such as an EEPROM or Flash memory. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

It is intended that the foregoing detailed description be regarded as illustrative rather than limiting, and that it be understood that the following claims, including all equivalents, are intended to define the scope of this design.

I claim:

1. An intelligent light comprising:
   a light source for coupling with a low voltage line; and
   a processor in communication with the light source and the low voltage line,
   wherein the processor determines a voltage on the low voltage line and operates intermittent switching of the light source as a function of the determined voltage, the intermittent switching used to set a duty cycle of the light source to compensate for a voltage drop in the low voltage line.

2. The intelligent light of claim 1, wherein the light source is within a housing, and wherein the housing is configured to be placed in an outdoor environment.

3. The intelligent light of claim 1, further comprising:
   a switching circuitry in communication with the processor operable to receive a signal from the processor and intermittently switch the light source on and off.

4. The intelligent light of claim 3, wherein the switching circuitry includes a transistor.

5. The intelligent light of claim 4, wherein the transistor corresponds to a MOSFET.

6. The intelligent light of claim 3, wherein the switching circuit includes a TRIAC.

7. The intelligent light of claim 3, wherein the signal comprises a phase control signal.

8. The intelligent light of claim 3, wherein the signal comprises a pulse width modulated signal.

9. The intelligent light of claim 1, wherein voltage on the voltage line is AC voltage.

10. The intelligent light of claim 1, further comprising a zero-crossing detection circuit operable to provide timing information to the processor.

11. The intelligent light of claim 10, wherein the processor determines the voltage on the low voltage line in relation to the timing information provided by the zero-crossing detection circuit.

12. The intelligent light of claim 1, further comprising a rectifier circuit operable to convert AC voltage on the low voltage line to a DC voltage.

13. The intelligent light of claim 1, further comprising a switch operable to manually turn on and off the light source.

14. An intelligent light system comprising:
   a plurality of light sources, each of the plurality of light sources within a separate housing and configured to be coupled with a low voltage line; and
   a processor in each of the separate housings, each processor in communication with the low voltage line and the respective light source,
   wherein each of the processors determines a voltage on the low voltage line and outputs a signal as a function of the determined voltage to intermittently switch the respective light source on and off, the intermittent switching used to set a duty cycle of the respective light source to compensate for a voltage drop in the low voltage line.

15. The intelligent light system of claim 14, wherein the intermittent switching maintains substantially the same output level for each of the plurality of light sources independent of the voltage on the low voltage line.

16. The intelligent light system of claim 14, further comprising a zero-crossing detection circuit in each of the separate housings operable to provide timing information to the processor in the same housing.

17. The intelligent light system of claim 16, wherein each of the processors determines the voltage on the low voltage line in relation to the timing information provided by the zero-crossing detection circuit in the same housing.

18. The intelligent light system of claim 14, further comprising a switch operable to manually turn on and off the plurality of light sources.

19. An intelligent light comprising:
   a light source for coupling with a low voltage line;
   a processor in communication with the light source and the low voltage line; and
   a photovoltaic cell in communication with the processor and operable to measure a light output level of the light source, wherein the processor operates intermittent switching of the light source as a function of measured light output so as to maintain the light output level of the light source.

20. The intelligent light of claim 19, further comprising a switch operable to manually turn on and off the light source.

21. An intelligent light comprising:
   a light source for coupling with a low voltage line;
   a processor in communication with the light source and the low voltage line; and
   a zero-crossing detection circuit operable to provide timing information to the processor;
   wherein the processor determines a voltage on the low voltage line and operates intermittent switching of the light source as a function of the determined voltage, the intermittent switching used to maintain an output level of the light source; and
   wherein the processor determines the voltage on the low voltage line in relation to the timing information provided by the zero-crossing detection circuit.

22. An intelligent light system comprising:
   a plurality of light sources, each of the plurality of light sources within a separate housing and configured to be coupled with a low voltage line;
   a processor in each of the separate housings, each processor in communication with the low voltage line and the respective light source; and
   a zero-crossing detection circuit in each of the separate housings operable to provide timing information to the processor in the same housing;
   wherein each of the processors determines a voltage on the low voltage line and outputs a signal as a function of the determined voltage to intermittently switch the respective light source on and off, the intermittent switching used to maintain an output level of each of the plurality of light sources; and
   wherein each of the processors determines the voltage on the low voltage line in relation to the timing information provided by the zero-crossing detection circuit in the same housing.

* * * * *